United States Patent [19]

Barrett, Jr.

[11] Patent Number: 5,251,725
[45] Date of Patent: Oct. 12, 1993

[54] LUBRICATION OF POWER DRIVE COMPRISING LARGE DIAMETER GEAR

[75] Inventor: Charles D. Barrett, Jr., Hoffman Estates, Ill.

[73] Assignee: Castrol Limited, Wiltshire, England

[21] Appl. No.: 909,974

[22] Filed: Jul. 7, 1992

[51] Int. Cl.$^5$ .............................................. F01M 9/00
[52] U.S. Cl. .................... 184/6.14; 184/6.27; 74/467; 74/468
[58] Field of Search .............. 184/6.12, 6.26, 6.27; 239/222.11, 222.19, 520; 74/467, 468, 606 A

[56] References Cited

U.S. PATENT DOCUMENTS

| | | |
|---|---|---|
| 703,327 | 6/1902 | White . |
| 753,730 | 3/1904 | Owen . |
| 927,315 | 7/1909 | Baldwin . |
| 1,325,513 | 12/1919 | Fricker . |
| 1,717,814 | 6/1929 | Strong et al. ............... 184/6.12 |
| 1,878,729 | 9/1932 | Sykes ............................ 184/6.12 |
| 2,235,793 | 3/1944 | Berger .......................... 184/6.12 |
| 2,692,798 | 10/1954 | Hicks . |
| 2,706,520 | 4/1955 | Chandler . |
| 2,960,061 | 11/1960 | Whitbeck . |
| 3,006,439 | 10/1961 | Molinaro ...................... 184/6.12 |
| 3,078,046 | 2/1963 | Tyler . |
| 4,460,127 | 7/1984 | Hofmann ....................... 239/126 |

OTHER PUBLICATIONS

Open Gear Lubrication Circulation System with Mobilgear SHC (TS7865F/1) dated Feb. 1992.

*Primary Examiner*—Thomas E. Denion
*Attorney, Agent, or Firm*—McAndrews, Held & Malloy

[57] ABSTRACT

A lubricator for large diameter open gearing utilizes a header having a series of orifices which direct streams of oil onto a deflector plate which produces a spray directed at the teeth of a drive pinion in close proximity to the point of first engagement on the approach side of the pitch point. Air turbulence generated by movement of the gear teeth is prevented from affecting the spray pattern by utilizing a collector for excess lubricant as a baffle and by utilizing the deflector plate to block the movement of air. Uniformity of spray pattern from the orifices is enhanced by providing a pressure relief valve remote from the feed points of the header.

16 Claims, 3 Drawing Sheets

LUBRICATION OF POWER DRIVE COMPRISING LARGE DIAMETER GEAR

BRIEF SUMMARY OF THE INVENTION

This invention relates to the lubrication of gearing, and more particularly to an improved lubricating system for power drives comprising large diameter gears.

Heavy duty gear drives, commonly referred to as "open" or "semi-enclosed" gear drives, are in widespread use for driving rotating equipment such as mills, kilns and driers. These drives have high load carrying capabilities and durability, and are capable of reliable operation under harsh operating conditions.

The common methods and products used to lubricate open gear drives have remained substantially unchanged for decades. However, over approximately the past fifteen years, improvements in metallurgy, design and manufacturing have resulted in the development of precision open gear drives which continuously operate close to their mechanical limits. During this same period, governmental agencies have implemented environmental regulations which have affected, and will continue to affect, the availability of economical and environmentally acceptable lubricants. As a result, lubrication has become an issue of increased concern for manufacturers and users of machinery equipped with heavy duty gear drives. There is currently an increasing demand for advanced, effective, efficient, and environmentally acceptable lubricants and lubrication systems.

The American Gear Manufacturers Association (AGMA) recognizes five basic methods of applying lubricants to open gear drives. These methods are (1) hand or brush application, (2) splash and idler immersion systems, (3) gravity feed or forced drip systems, (4) intermittent mechanical spray systems, and (5) continuous pressure lubrication.

The hand or brush application methods employ a stiff brush, a flat blade or a similar device to apply residual compounds, special open gear compounds, or open gear greases, directly onto the pinion and gear teeth surfaces. The frequency and rate of lubricant application is determined by observation.

The hand or brush application method has the advantage that it can be implemented at minimum cost, and is effective on small gears. However, it is only suitable for use with light to moderately loaded open gear drives. Furthermore, it presents potential safety hazards, and is labor intensive. Adequacy of lubricant coverage is dependent on the degree of care exercised by the individuals charged with the task of applying the lubricant. This method can also present significant housekeeping problems. It generally requires residual lubricants, or lubricants cut back with a solvent such as 1,1,1-trichloroethane. It is difficult and costly to dispose of spent lubricant, which can be classified as hazardous or toxic waste.

Splash and idler immersion systems are the simplest methods of lubricating open gear drives. The main gear, or an idler which is in constant mesh with the main gear, is allowed to dip into a fluid lubricant and carry it to the mesh of the pinion and gear.

The splash and idler immersion systems have the benefit of low initial cost, low maintenance cost, nominal lubricant usage, environmentally acceptable lubricants, and low cost of disposal of spent lubricant. However, splash systems are limited to a maximum pitch line velocity of 2,000 feet per minute (610 meters per minute) to avoid excessive lubricant fling off. Idler immersion systems are limited to maximum pitch line velocities of 300 ft./min. (91.5 m./min.) to avoid lubricant channeling and/or fling off. Furthermore housekeeping costs can be high when system leaks occur. Another disadvantage is that it is difficult to prevent the intrusion of airborne contaminants. Still another disadvantage is that wear debris collects in the system contaminating the lubricant, and contaminated lubricant accelerates pinion and gear wear.

Gravity feed or forced drip systems utilize one or more metering pumps, or a cascade pan which permits oil to drip into the pinion and gear mesh at a controlled rate.

Gravity feed and forced drip systems have a relatively low initial cost, and minimal maintenance cost. They also have the advantage that contaminants and wear debris are flushed from the gear teeth, and they use fluid lubricants which are considered environmentally safe. Gravity feed and forced drip methods, however, are limited to maximum pitch line velocities of 1,500 ft./min. (474.5 m./min.). Another disadvantage is that these are once-through systems, involving a high rate of lubricant consumption, and consequent high lubricant and disposal costs. These systems entail major housekeeping problems. In addition, failures in the lubricant system can occur, which may result in severe damage to the pinions and gears.

Intermittent mechanical spray systems depend on the use of viscous fluids, residual compounds, or special open gear compounds, which will adhere to the gear teeth through several revolutions. The spray device may be activated by hand or by an automatic controller. The lubricant is generally applied to the pressure side of the gear teeth just after the mesh, for a duration equal to a minimum of one, and preferably two revolutions of the gear. Two hours between lubricant applications is considered to be the maximum permissible interval. However, more frequent application of small quantities of lubricant is preferred.

Intermittent mechanical spray systems have the advantage of moderate initial cost and low to moderate maintenance costs. They have the disadvantage that improper adjustment and component failure can result in pinion and gear damage. A further disadvantage of these systems is the high cost of spent lubricant disposal.

In the case of viscous fluid lubricants, for example AGMA 12EP or 13EP oil, and in the case of cutback asphaltic or residual lubricants, contaminants and wear debris can be flushed from the gear teeth. However, once-through systems utilizing these lubricants have a high rate of lubricant consumption, with attendant high costs, and difficulty in disposing of the spent lubricant. These lubricants can also present significant housekeeping problems.

Cutback asphaltic or residual lubricants, and high performance grease or cutback compounds, are usually tolerant of minor lubricating system malfunctions, and provide minimal reserve lubrication in the event of system failure. However, with these lubricants, system maintenance can be labor intensive, and spent lubricant may cause severe buildup in the gear guards. Furthermore, spent lubricants can be classified as hazardous or toxic waste.

High performance greases or cutback compounds, have the advantage of low to moderate lubricant consumption rates. However, these lubricants can attract contaminants, especially in harsh environments, and mixtures of lubricants and contaminants can form in the gear roots.

Continuous pressure lubrication systems employ a circulating pump to provide a continuous spray of lubricant to the gear or pinion. Spent fluid flows back to the pump where it is collected and recirculated within the system.

Continuous pressure lubrication provides maximum protection against gear and pinion wear as contaminants and wear debris are flushed from the gear and pinion teeth. Lubricant consumption is minimal and maintenance costs are low. With continuous pressure lubrication, environmentally acceptable lubricants can be used, and disposal of spent lubricant is relatively inexpensive. Continuous pressure lubrication, however, requires good to excellent gear enclosures, and may cause housekeeping problems if leaks develop in the gear enclosure. It has the highest initial installation cost of all the lubrication systems used with heavy duty gearing, and has the further disadvantage that failure of key components can cause severe damage to the pinion and gear.

Hand and gravity feed or forced drip methods of open gear lubrication have traditionally been limited to noncontinuous duty applications and to continuous duty applications in lightly loaded rotating equipment. Prior to the development of reliable, low initial cost intermittent spray systems, large, heavily loaded continuous duty rotating machinery equipped with open gear drives depended predominantly on splash or idler immersion methods for lubrication. With the introduction of reliable intermittent spray systems having low initial cost, equipment manufacturers and users quickly developed a preference for this method of lubrication.

Intermittent spray systems allow excellent flexibility in designing open gear drive enclosures that are modestly sized, of simple construction, and are easy to remove for routine drive servicing. The physical nature of open gear lubricants engineered for application by intermittent spray are such that drive enclosures also do not have to be liquid tight. As a result, the use of an intermittent spray lubrication system can substantially reduce the initial installed cost of rotating machinery equipped with an open gear drive, as compared to the same machinery equipped with a splash, idler immersion or circulating oil method of lubrication. Additionally, as the machine ages, maintaining drive enclosure integrity is less crucial than with splash, idler immersion or circulating oil systems.

Were it not for increasing environmental awareness, intermittent spray would undoubtedly remain the most popular method employed. However, many of the residual and high performance lubricants that comply with AGMA requirements for intermittent spray-applied open gear lubricants, contain components which are currently, or targeted to become, environmentally unacceptable for continued economical usage. AGMA-specified environmentally acceptable fluid lubricants are generally too costly to use and dispose of in the quantities that are required for effective lubrication.

The principal objective of the present invention is to provide an improved lubricating system for open gear drives which provide effective lubrication while reducing or eliminating hazards, costs and other drawbacks associated with prior lubricating systems, as discussed above.

In accordance with the invention, a conventional liquid lubricant, for example a gear oil having an International Standard Organization (ISO) viscosity grade of 680 mm$^2$/s (Centistoke) at 40° C., is sprayed continuously onto the drive pinion. The key to the successful use of sprayed gear oil is uniform application. This is achieved by directing multiple streams of oil, all at the same velocity, toward a deflector located in very close proximity to the mesh of the gear and pinion, on the approach side of the pitch point, so that an oil spray, generated at the deflector, is directed at the pinion, and by preventing air turbulence generated by gear tooth movement from interfering with the uniform application of the spray to the pinion.

More specifically, the lubricating system, in accordance with one aspect of the invention, comprises a header at the approach side of the pitch point of a gear and pinion. The header extends substantially parallel to the axis of the gear and has a plurality of orifices for the flow of lubricant in streams outward from the interior of said header. Deflector means, located between the gear and pinion on the approach side of the pitch point and in the paths of the streams, breaks up each of the streams into a spray directed toward the pinion.

In order to obtain uniformity in the velocity of oil flow from the orifices of the header, the header is provided with at least one inlet and an outlet. Supply means are connected to each inlet for supplying a liquid lubricant under pressure to the header, and a pressure relief valve is connected to the outlet. The pressure relief valve is set to open, and thereby permit flow of lubricant from the header through the outlet, when the pressure of the lubricant at the outlet exceeds a predetermined level below the pressure at which the lubricant is supplied by the supply means. Uniformity of velocity ensures that lubricant streams emitted from orifices of the header strike the deflector at the proper locations to ensure that lubricant is sprayed uniformly onto the teeth of the pinion.

In order to reduce the effect of air turbulence on the lubricant spray, a collector having an opening located within the space below the pinion and within the guard, is positioned to receive excess lubricant from the gearing, and a conduit is provided for the return of lubricant from the collector to a reservoir. The collector provides a barrier substantially reducing the turbulent movement of air induced by motion of the teeth of the gear, so that a substantially dead air space is provided at the location at which lubricant is sprayed onto the gearing. Preferably, the collector has a baffle extending toward the teeth of the gear so the collector and baffle together provide a barrier substantially reducing turbulent movement of air induced by motion of the gear teeth.

Further objects, details and advantages of the invention will be apparent from the following detailed description, when read in conjunction with the accompanying drawings.

DETAILED DESCRIPTION

Figure 1:
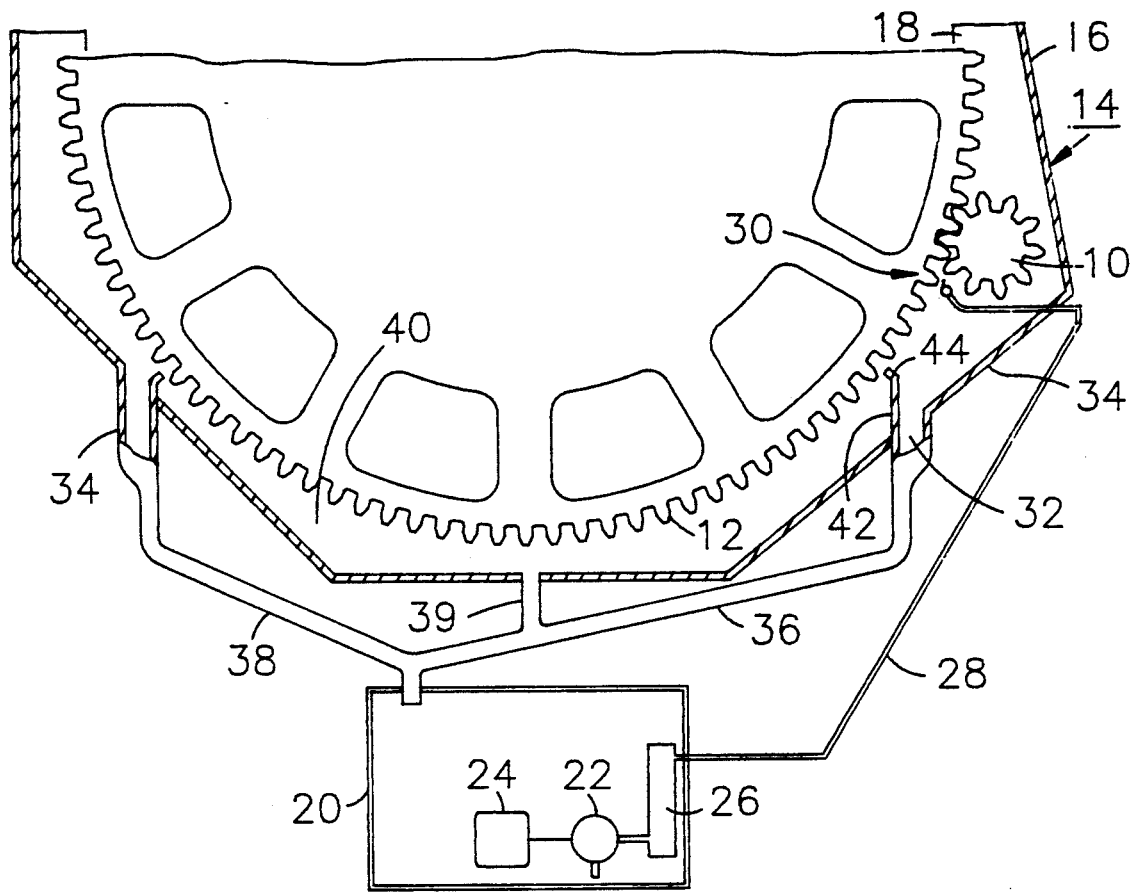
FIG. 1 is a fragmentary schematic radial section illustrating a pinion and large diameter gear provided with a lubrication system in accordance with the invention.

In FIG. 1, a drive pinion 10 is in mesh with a large diameter gear 12. The large diameter gear is typically in the range of 6 feet to 36 feet (1.8 to 11 m.) or more in diameter, and may be used for various purposes, such as driving a large drum in a cement plant, in a mining or ore processing operation, or in a paper or pulp plant. Pinion 10 is driven clockwise by a motor, and drives gear 12 counterclockwise.

Gear 12 is provided with a guard 14, which encases at least the lower portion of gear, and may extend around the entire periphery of the gear. The outside wall of the guard is shown at 16, and rear wall is shown at 18. The front wall, which is similar in shape to rear wall 18, is not shown in FIG. 1. The guard also encloses pinion 10, and is shaped accordingly.

An oil reservoir, shown schematically at 20, contains a pump 22, driven by a motor 24. The pump delivers oil, from the interior of the reservoir, through a filter 26, to a line 28, which delivers the oil, under pressure, to a lubricator generally indicated at 30. Oil is returned to the reservoir from a pair of collectors 32 and 34, the former being located underneath the lubricator, and the latter being located on the opposite side of the guard. Excess lubricant dripping from pinion 10 runs down the sloping portion 34 of wall 16 into collector 32, and is returned by conduit 36 to reservoir 20. Similarly, excess oil which drips from the opposite face of gear 12 runs into collector 34 and is returned to reservoir 20 through conduit 38. A conduit 39, connected to conduit 36, is provided for the return of lubricant which collects in the bottom of the guard.

Movement of the teeth of gear 12 induces air turbulence in the lower portion 20 of guard 14. As shown in FIG. 1, wall 42 of collector 32 serves as a baffle, and prevents the air turbulence in lower portion 40 of the guard from affecting the spray pattern of lubricator 30. To enhance the turbulence blocking effect of wall 42, a lip 44, provided on the upper edge of wall 42, extends toward the teeth of gear 12, and is preferably spaced from the gear teeth by a distance of 2 inches (5.1 cm.) or less.

As seen in FIG. 1, lubricator 30 extends inward through the outer wall 16 of guard 14, and then upward into the space between pinion 10 and gear 12, on the approach side of the pitch point, very near to the first point of contact.

Figure 2:
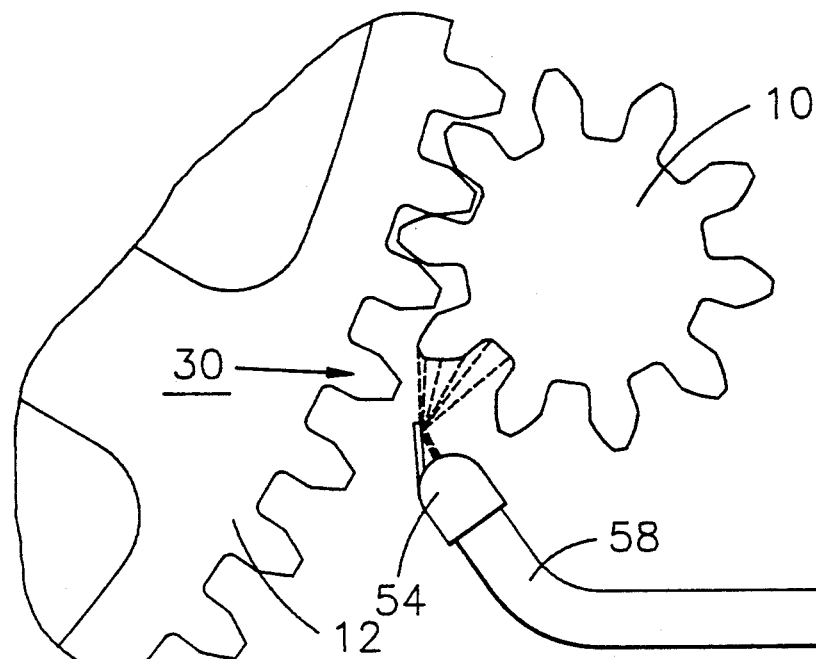
FIG. 2 is an enlarged fragmentary elevational view showing details of the pinion, gear and lubricant spray.
Figure 3:
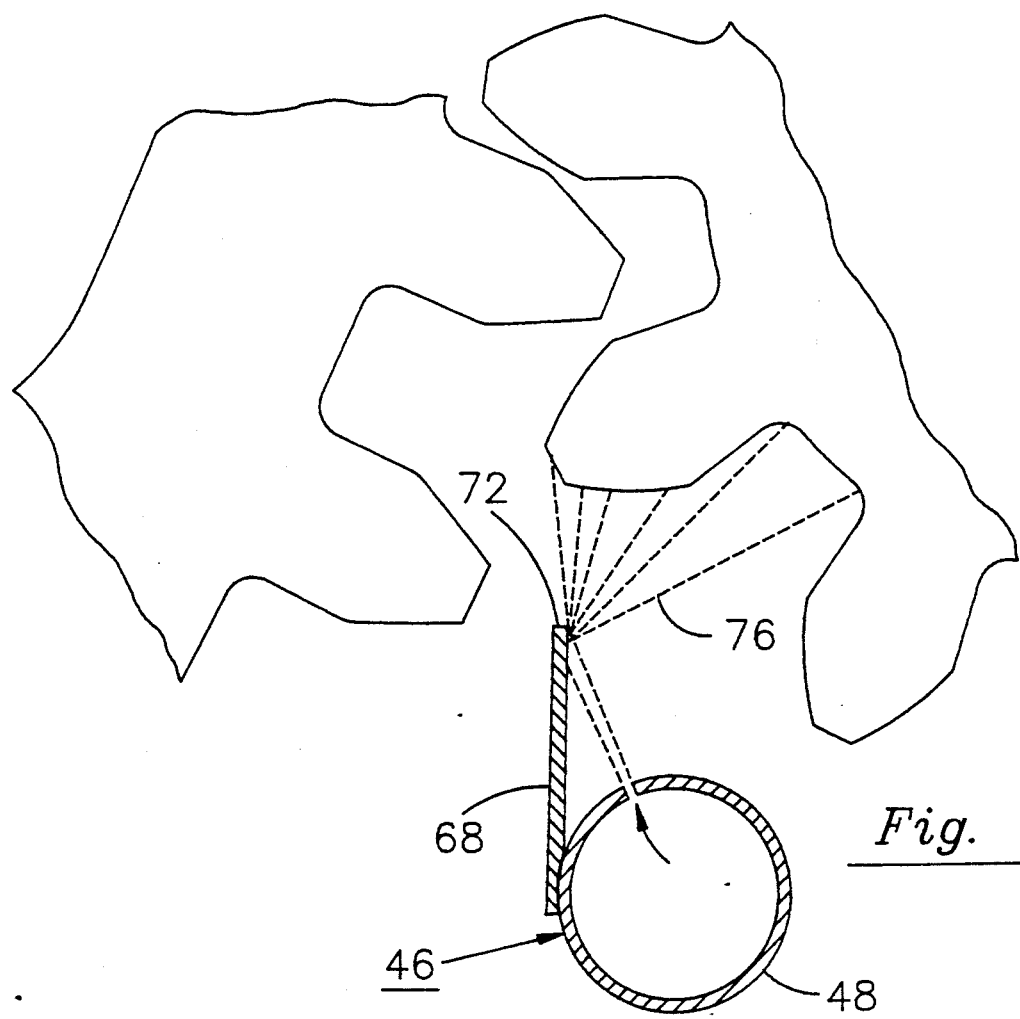
FIG. 3 is a still further enlarged fragmentary elevational view showing details of the lubricant spray.
Figure 4:
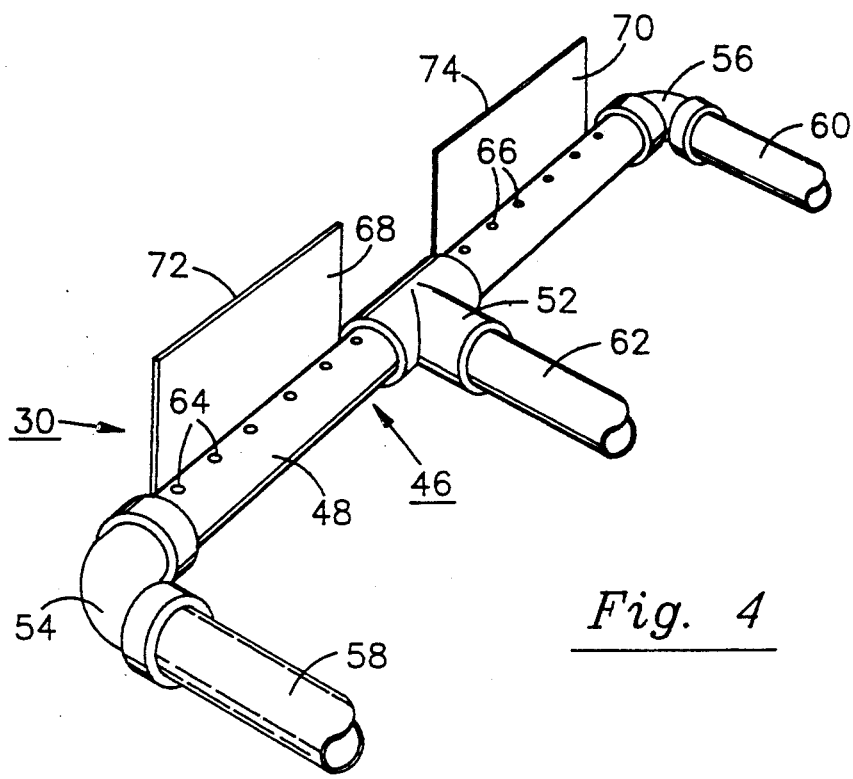
FIG. 4 is a fragmentary perspective view of the spray header and deflectors.

As shown in FIGS. 2, 3 and 4, lubricator 30 comprises an assembly of piping in which a header 46, extending parallel to the axis of rotation of gear 12, is formed by two lengths of pipe 48 and 50 connected end to end by a T-fitting 52. The outer ends of pipe lengths 48 and 50 are connected respectively through elbows 54 and 56 to pipes 58 and 60. The leg of T-fitting 52 is connected to a centrally located pipe 62. All three pipes 58, 60 and 62 are parallel to one another, and bent, as shown in FIG. 2 so they approach the gearing horizontally and are bent upward at an inclined angle to enter the space between gear 12 and pinion 10 on the approach side of the pitch point. The bent configuration of the pipes allows the lubricator assembly to be rigidly mounted on a frame (not shown) which also supports the bearings and drive motor for pinion 10. Rigid mounting of the lubricator assembly is important because of its very close proximity to the moving teeth of the gear and pinion.

As seen in FIG. 4, each of pipes 48 and 50 is provided with a row of orifices, there being six uniformly spaced orifices 64, and six similar orifices 66 in pipe 60. Metal deflector plates 68 and 70 are welded to pipes 48 and 50 respectively, with their edges 72 and 74 extending parallel to the rows of orifices and positioned so that streams of lubricant issuing from the orifices strike the plates near their edges 72 and 74, as shown in FIG. 3. The deflector plates break up the streams of lubricant issuing in laminar flow from the orifices into sprays 76, which are directed toward the teeth of pinion 76, preferably over a distance extending from the point of first engagement to a point spaced by one to three teeth from the point of first engagement. The edges 72 and 74 of the deflector plates are preferably within one inch (2.54 cm.) from the teeth of pinion 10. The deflector plates are welded to pipes 48 and 50 at a location such that streams of lubricant issuing from the orifices strike the plates at an angle preferably between about 45° and 60°.

The deflector plates also help to reduce the effect of air turbulence on the uniformity of the lubricant spray pattern by directing air away from the area of lubricant application.

The use of deflectors in close proximity to the pinion teeth to produce a lubricant spray, and the use of collectors and deflectors as baffles to reduce the effect of air turbulence on the spray, help to achieve uniform application of lubricant to the pinion. However, uniformity of spray application is further enhanced by ensuring that velocities at which lubricant issues from the orifices, are uniform over the length of header 46.

If a header is simply fed with lubricant under pressure at one end, the rate of flow through its orifices near the opposite end would be less than the rate of flow through the orifices near the feed point. Similarly, even if lubricant were fed to both ends of a header, the rate of flow through orifices remote from the feed points would be less than the rate of flow through orifices near the feed point. These differences in flow can have an adverse effect on the spray pattern.

Figure 5:
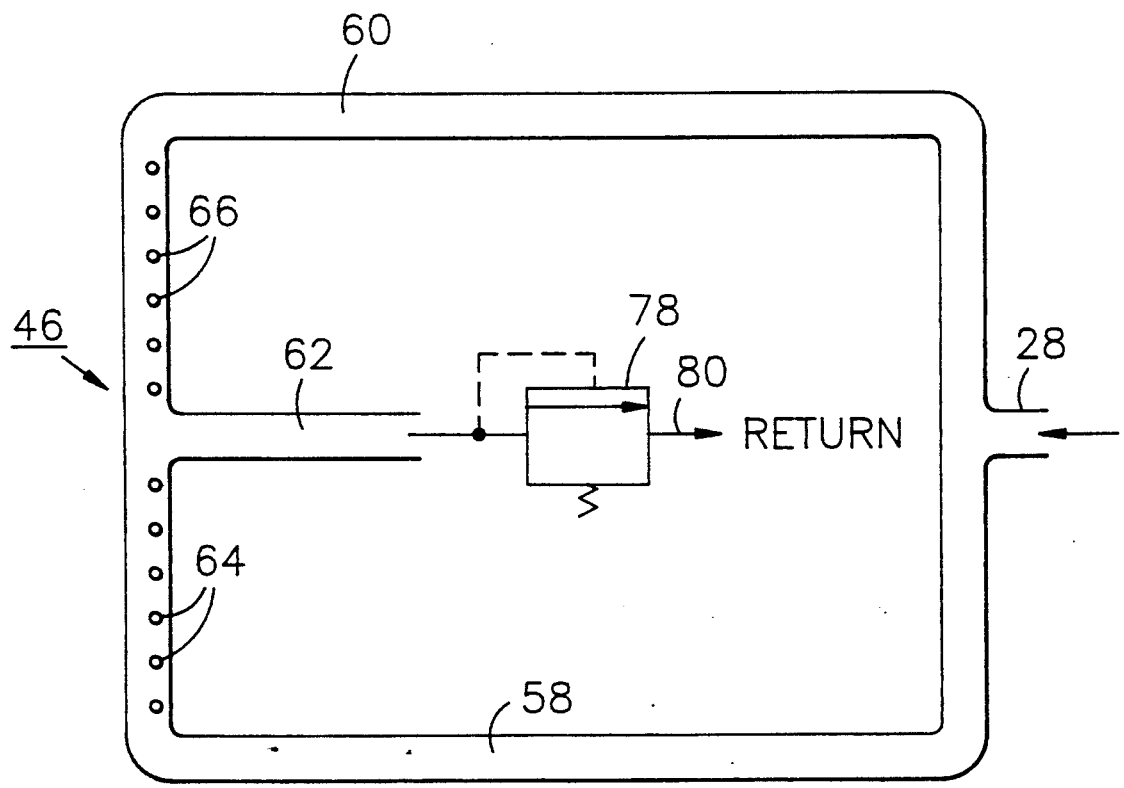
FIG. 5 is a schematic diagram showing the path of lubricant in the spray header.

In order to achieve uniformity of flow from the orifices, the lubricator utilizes a piping configuration and pressure relief valve as shown in FIG. 5. Lubricant is delivered from reservoir 20 (FIG. 1) under pressure through line 28. The flow is split and delivered to opposite ends of header 46 through pipes 58 and 60. A pressure relief valve 78 is provided in central pipe 62, and excess lubricant is returned through line 80 to reservoir 20 (FIG. I). The pressure relief valve is set to a pressure less than that at which lubricant is supplied through line 28 by pump 22. It regulates pressure in header 46 by bleeding off excess lubricant. Proper setting of the regulator depends on viscosity of the lubricant and supply pressure. It should be set so there is a continuous flow of some lubricant through the relief valve. This ensures that pressure within header 46 is substantially constant, so that flow velocities at all the orifices are substantially equal. A suitable pressure relief valve is the Fulflo "SVB" series valve, manufactured by Fulflo Specialties Co., 414 E. Fancy Street, Blanchester, Ohio, 45107. In a typical system, using an ISO V.G. 680 gear oil, the pressure relief valve may be set to 50 p.s.i., for example. Lower or higher pressure settings can be used, of course, depending primarily on the character of the lubricant being used.

It is, of course, possible to feed the header at one end and provide a pressure relief valve at the opposite end.

The pressure relief valve, if properly set so that a continuous flow of excess lubricant passes through it, will allow uniform flow through orifices of the header. An advantage to feeding header 46 with lubricant at both ends is that, on start up, turbulence is produced in the lubricant flow, which promotes cleaning of the orifices and interior of the header.

As will be apparent from the foregoing, the invention utilizes several features to achieve uniform and reliable lubrication of large diameter open gearing by continuous spray application of conventional gear oils. The lubricator utilizes a deflector which produces a spray directed at the teeth of the pinion in close proximity to the point of first engagement on the approach side of the pitch point. Air turbulence generated by movement of the gear teeth is prevented from affecting the spray pattern by utilizing a collector for excess lubricant as a baffle and by utilizing the deflector plates to block movement of air. Uniformity of the spray pattern from a header having multiple orifices is further enhanced by providing a pressure relief valve remote from the feed point or feed points of the header.

The invention makes it possible to achieve reliable, virtually maintenance free, open gear lubrication, at low cost, using environmentally acceptable lubricants. It reduces or eliminates risks, housekeeping problems, wear, gear damage, and other drawbacks associated with conventional lubrication methods.

Various modifications can be made to the invention as described herein. For example, because the lubricant is applied by spraying, it is desirable to provide improved sealing between the guard and the gear, and between the guard and the pinion or pinions. This can be effected by means of closer tolerances in the guard construction, or alternatively by providing air curtains or "air knives" to prevent the escape of lubricant mist from the interior of the guard. In large diameter gearing using dual pinions, a lubricator corresponding to lubricator 30 can be provided in conjunction with each pinion, with each lubricator being located on the approach side of the pitch point so the teeth of each pinion are sprayed with lubricant before they come into mesh with the gear teeth. In another version of the lubricator, a header having a series of orifices for delivering streams of lubricant toward deflectors, can be made part of a loop, with a lubricant inlet in the loop adjacent to one end of the header and a pressure relief valve connected to the loop at a location adjacent to the opposite end of the header. The loop permits turbulence to be generated in the lubricant during start-up for cleaning the interior of the header and dislodging debris from orifices.

Still further modifications will occur to persons skilled in the art, and can be made without departing from the scope of the invention as defined in the following claims.

I claim:

1. In a power drive comprising first and second gears in mesh with each other, said gears having an approach side, a pitch point and axes of rotation, a lubricating system comprising:
   means providing a header at the approach side of the pitch point of said gears, said header having an interior and extending substantially parallel to the axis of said second gear and having a plurality of orifices for the flow of lubricant in streams outward from the interior of said header; and
   deflector means, located between said gears on the approach side of said pitch point and in the paths of said streams, for breaking up each of said streams into a spray directed toward said second gear.

2. A power drive according to claim 1 in which said deflector means comprises at least one baffle supported on said header and extending therefrom into a space between said gears on the approach side of the pitch point.

3. A power drive according to claim 2 including pump means for supplying the lubricant under pressure to the interior of said header, and in which said orifice means are of a size and shape to effect laminar flow of the lubricant in said streams.

4. A power drive according to claim 3 in which said baffle has an edge extending substantially parallel to the axis of said second gear, and in which said streams are directed toward locations on said baffle immediately adjacent to said edge.

5. A power drive according to claim 1 in which said deflector means is located within one inch from said second gear.

6. A power drive according to claim 1 in which said orifices and said deflector means are positioned to direct said spray toward said second gear, at a location within three teeth from a first point of contact of said gears on the approach side of the pitch point.

7. A power drive according to claim 1 in which said deflector means comprise at least one baffle extending into a space between said gears on the approach side of the pitch point and positioned to shield and spray from movement of air induced by movement of the teeth of said first gear.

8. In a power drive comprising gearing, a lubricating system for applying liquid lubricant to the gearing comprising:
   means providing a header having at least one inlet at a first location and an outlet at a second location remote from said first location, and having means providing a plurality of orifices located along said header between the location of said at least one inlet and the location of aid outlet for the flow of the lubricant outward from the interior of said header;
   means, connected to each said inlet for supplying the liquid lubricant under pressure to said header; and
   a pressure relief valve connected to said outlet, said pressure relief valve being set so that it opens, and thereby permits flow of the lubricant from said header through said outlet, when the pressure of the lubricant at said outlet exceeds a predetermined level below the pressure at which said liquid lubricant is supplied by said supplying means under normal conditions of operation, when said orifices are clear;
   whereby lubricant is continuously bled off through said outlet to ensure a substantially constant pressure within said header and substantially equal velocities of flow of lubricant through said orifices.

9. A power drive according to claim 8 in which said gearing comprises first and second gears in mesh with each other, said gears having an approach side, a pitch point, and axes of rotation, and in which said header is located at the approach side of the pitch point of said gears, and extends substantially parallel to the axis of said second gear.

10. In a power drive comprising gearing, a lubricating system for applying liquid lubricant to the gearing comprising:

means providing a header having an interior and a plurality of orifices for the flow of lubricant outward from the interior of said header, and said header having at least one inlet and an outlet;

means, connected to each said inlet for supplying a liquid lubricant under pressure to said header; and a pressure relief valve connected to said outlet, said pressure relief valve being set so that it opens, and thereby permits flow of the lubricant from said header through said outlet, when the pressure of the lubricant at said outlet exceeds a predetermined level below the pressure at which said liquid lubricant is supplied by said supplying means;

in which said gearing comprises first and second gears in mesh with each other, said gears having an approach side, a pitch point and axes of rotation, and in which said header is located at the approach side of the pitch point of said gears, and extends substantially parallel to the axis of said second gear;

in which said orifice providing means to deliver said flow of the lubricant in streams; and including deflector means for breaking up each of said streams into a spray.

11. A power drive according to claim 10 including means for providing a lubricant reservoir, and in which said means for supplying the liquid lubricant under pressure to said header, comprises a pump having an inlet in communication with said reservoir, and an outlet connected to said header, and including means for returning the lubricant from the outlet of said pressure relief valve to said reservoir.

12. In a power drive comprising gearing, a lubricating system for applying liquid lubricant to the gearing comprising:

means providing a header having an interior and a plurality of orifices for the flow of the lubricant outward from the interior of said header, and said header having at least one inlet and an outlet;

means, connected to each said inlet for supplying a liquid lubricant under pressure to said header; and a pressure relief valve connected to said outlet, said a pressure relief valve being set so that it opens, and thereby permits flow of the lubricant from said header though said outlet, when the pressure of the lubricant at said outlet exceeds a predetermined level below the pressure at which said liquid lubricant is supplied by said supplying means;

in which said header has two inlets, respectively at opposite ends thereof, and in which said outlet is located at an intermediate location between said inlets.

13. A power drive according to claim 12 in which the number of said orifices between said outlet and one of said inlets, is equal to the number of orifices between said outlet and the other of said inlets.

14. A power drive according to claim 12 in which said outlet is located substantially midway between said two inlets.

15. In a power drive having gearing comprising first and second gears in mesh with each other, said gearing having a pitch point and an approach side, and each of said gears having an axis of rotation, teeth and a periphery, and a guard extending at least part way around the periphery of said first gear, with the second gear being located between the guard and said first gear, whereby a space is provided between the guard and the first gear on the approach side of the pitch point of said gears, a lubricating system comprising:

means for receiving a liquid lubricant and spraying said lubricant onto said gearing at a location on the approach side of the pitch point of said gears;

means providing a lubricant reservoir;

pump means for supplying a liquid lubricant from said reservoir under pressure to said spraying means;

collector means having an opening located within said space, said collector means being positioned for flow of excess lubricant from said gearing into said opening; and means providing a header for the return of lubricant from said collector to said reservoir;

in which said collector means provides a barrier substantially reducing turbulent movement of air induced by motion of the teeth of said first gear, whereby a substantially dead air space is provided at the location at which the lubricant is sprayed by said spraying means onto said gearing.

16. In a power drive having gearing comprising first and second gears in mesh with each other, said gearing having a pitch point and an approach side, and each of said gears having an axis of rotation, teeth and a periphery, and a guard extending at least part way around the periphery of said first gear, with the second gear being located between the guard and said first gear, whereby a space is provided between the guard and the first gear on the approach side of the pitch point of said gears, a lubricating system comprising:

means for receiving a liquid lubricant and spraying said lubricant onto said gear in at a location on the approach side of the pitch point of said gears;

means providing a lubricant reservoir;

pump means for supplying a liquid lubricant from said reservoir under pressure to said spraying means;

collector means having an opening located within said space, said collector means being positioned for flow of excess lubricant from said gearing into said opening; and means providing a header for the return of lubricant from said collector to said reservoir;

in which said collector means includes baffle means extending toward the teeth of said first gear and in which said collector means and said baffle means together provide a barrier substantially reducing turbulent movement of air induced by motion of the teeth of said first gear, whereby a substantially dead air space is provided at the location at which the lubricant is sprayed by said spraying means onto said gearing.

* * * * *